(12) United States Patent
Hashimoto (10) Patent No.: US 6,904,108 B2
(45) Date of Patent: Jun. 7, 2005

(54) BANDPASS-LIMITING DEVICE FOR A RECEIVER

(75) Inventor: Yoshiteru Hashimoto, Tokyo (JP)

(73) Assignee: Vertex Standard Co., Ltd., Tokyo (JP)

(*) Notice: Subject to any disclaimer, the term of this patent is extended or adjusted under 35 U.S.C. 154(b) by 731 days.

(21) Appl. No.: 09/764,028

(22) Filed: Jan. 16, 2001

(65) Prior Publication Data

US 2001/0008549 A1 Jul. 19, 2001

(30) Foreign Application Priority Data

Jan. 17, 2000 (JP) ........................................ 2000-008312

(51) Int. Cl.$^7$ .............................................. H04L 27/06
(52) U.S. Cl. ................................... 375/344; 455/160.1
(58) Field of Search ................................ 375/240, 316, 375/340, 377, 344; 331/179, 30, 31, 32, 34, 177 R, 1 R; 455/130, 150.1, 161.1, 168.1, 188.1, 189.1, 190.1, 191.1, 192.1, 192.2, 192.3, 196.1, 197.1, 197.3, 199.1, 200.1, 230, 334, 335, 314, 323, 160.1, 161.2, 105.1, 151.4; 327/100; 340/384.1

(56) References Cited

U.S. PATENT DOCUMENTS 5,548,617 A * 8/1996 Patel et al. ................. 375/316
5,913,155 A * 6/1999 Tomiyama ................. 455/142

* cited by examiner

Primary Examiner—Tesfaldet Bocure
Assistant Examiner—Pankaj Kumar
(74) Attorney, Agent, or Firm—Fulwider Patton Lee & Utecht, LLP (57) ABSTRACT

In a bandwidth-limiting apparatus, control is performed of the oscillation frequencies of each of three local oscillators of three intermediate-frequency circuits, and the passband is limited by adjusting the width of and shifting the IF, the intermediate frequency at the last stage being converted by a frequency conversion means to a low frequency suitable for processing, which is then bandwidth limited by a filter function of a digital signal processor. Control of each passband is performed in linked fashion by control stored in a microcomputer circuit, and the sharp shape factor of the digital signal processor is effectively used to eliminate noise from the deviation passband. Because noise is eliminated before the detection stage, there is no cause for the intrusion of wraparound noise, thereby eliminating the necessity to perform excessive bandwidth limiting.

26 Claims, 4 Drawing Sheets

BANDPASS-LIMITING DEVICE FOR A RECEIVER

FIELD OF THE INVENTION

The present invention relates to a bandpass-limiting device for a receiver, suitable for use in an SSB radio receiver or the like, and more particularly to a bandpass-limiting method using a digital filter for the purpose of effectively eliminating unwanted signals.

RELATED ART

Recently, digital signal processors (DSPs) have been used in the field of radio communications for the purpose of signal processing, and transceivers exist which utilize low-frequency filters or intermediate-frequency filters implemented using DSPs.

A filter formed by a DSP is free from variations in various characteristics, such as experienced with analog filters (active filters implemented with elements such as operational amplifiers), and do not require consideration of such factors as temperature variation and aging. In particular, a digital filter can be precisely set to desired amplitude characteristics and shape factor, exhibiting such desired characteristics according to theory, and has the advantage of being able to achieve a sharp shape factor that is close to the value 1.

In a superheterodyne radio receiver in which a plurality of frequency conversions are performed, an intermediate frequency (IF) bandpass filter (BPF) can be implemented as an analog filter, and a DSP filter can be applied as a low-frequency filter after detection, the local oscillation frequencies of local oscillators used for the purpose of converting frequency in each frequency mixer to an intermediate frequency being controlled, and a means for changing the bandpass (IF width or IF shift) is combined with a low-frequency DSP filter, variable control being performed of each filter independently, so as to achieve a desired passband at a received frequency, resulting in an audio output from which unwanted signal interference and noise have been removed.

However, the adjustment of the IF width and IF shift to achieve a desired passband is established by an intermediate-frequency filter, which is implemented as an analog filter, and the DSP filter is often set so as to have a sharp shape factor as noted above, it being difficult to perform variable control of each filter while achieving coincidence between the passbands of both, leading to the problem of not being able to eliminate an unwanted signal with good efficiency.

Given the above, the inventor has proposed (in Japanese Patent No. 2887789) a bandwidth-limiting system having, in a multiple superheterodyne radio receiver with two or more frequency conversions, means for adjusting the passband of an intermediate frequency and a filter means for varying the passband for low frequencies, using a digital signal processing means, these means being linked and variable, and the passbands of each being simultaneously and equivalently varied, so that, with respect to a desired signal received by the radio receiver, the influence of an unwanted signal that can occur is caused to be reduced, and also so that this series of operations is entirely performed by a main control means.

Figure 5:
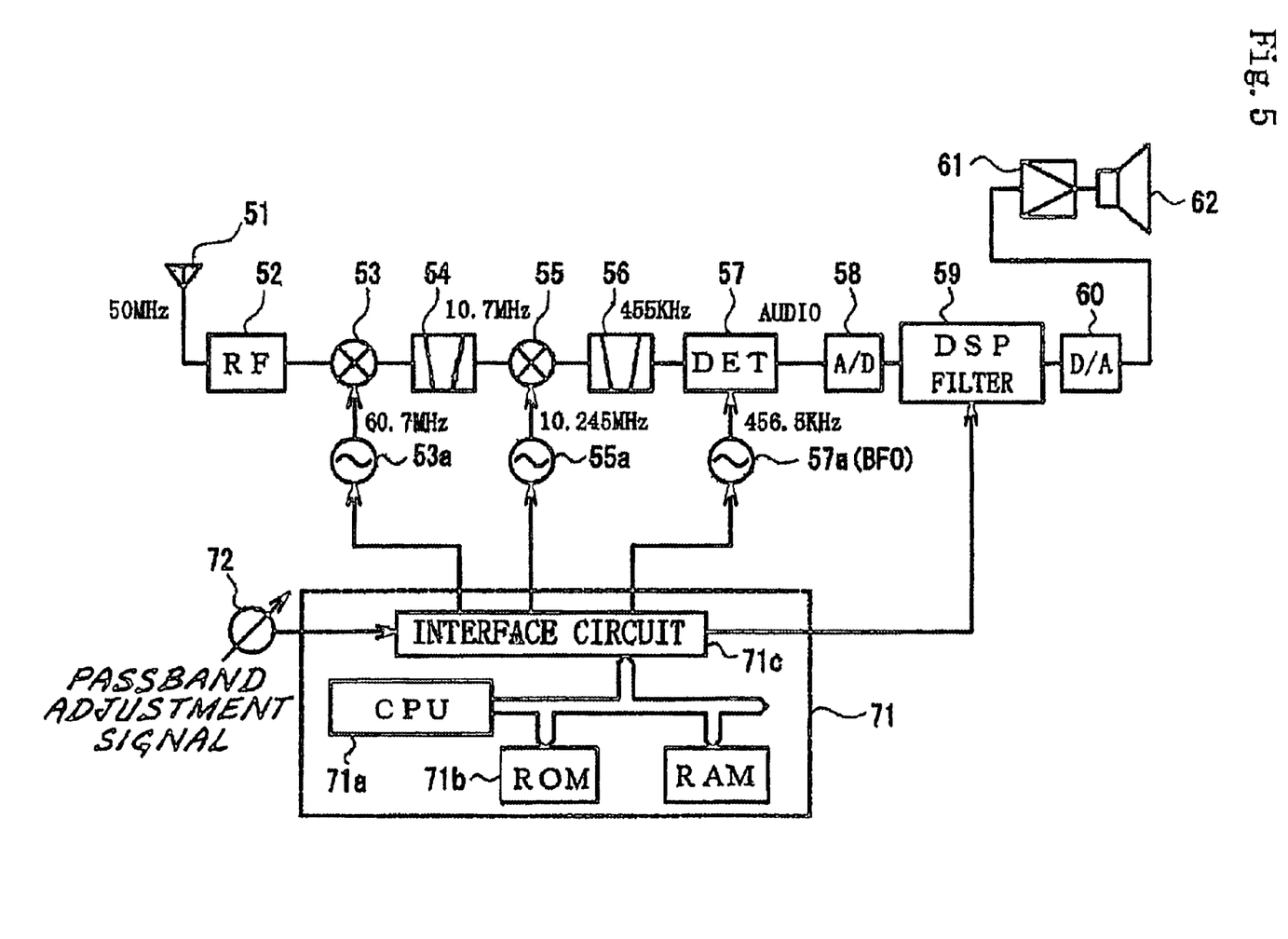
FIG. 5 is a system block diagram of a radio receiver in the prior art.

More specifically, this is an SSB (radio transmission modes J3E and R3E) radio receiver and bandpass-limiting system, such as shown in the system block diagram of FIG. 5.

A received signal (in the 50-MHz band) from the antenna 51 is amplified by an RF amplifier 52 and input to a first frequency mixer 53, at which it is mixed with a local oscillator signal (60.7 MHz) from a first local oscillator 53a, after which a first intermediate-frequency (IF) signal (10.7 MHz) is obtained, using the first IF filter (BPF) 54. The above-noted first IF signal is input to a second frequency mixer 55, at which it is mixed with a local oscillator signal (10.7245 MHz) from a second local oscillator 55a, so as to obtain a second IF signals (455 kHz), using a second intermediate-frequency filter (BPF) 56.

The second IF signal is input to a detector 57, at which it is mixed with a carrier signal (456.5 kHz) from a beat frequency oscillator (BFO) 57a, thereby resulting in a demodulated SSB audio signal (0.3 kHz to 2.7 kHz).

The above-noted audio signal is passed through an A/D converter 58, the output of which is input to a low-frequency DSP filter 59, at which bandpass limiting is perform, so as to removed an unwanted signal, the resulting output from which being passed through a D/A converter 60, which converts the signal to an analog signal, which is amplified by an audio amplifier 61, and output as an audio signal from a speaker 62.

In this radio receiver, each of the local oscillators 53a, and 55a, and the DSP filter 59 are controlled in linked fashion by a microcomputer circuit 71, this microcomputer circuit 71, based on an adjustment signal of a bandpass adjuster 72, causing the local oscillator frequency of the local oscillators 53a and 55a to change by a minute step, so as to control the bandwidth by changing the IF width and IF shift, the result being that the DSP filter 59 is bandwidth limited by an equivalent amount to the above-noted limit amount.

That is, the IF width and IF shift according to control of the local oscillators 53a and 55a is simply bandwidth limiting of a virtual filter FL (if) comprising an IF stage, a ROM 71b of the microcomputer circuit 71 having stored in it a bandwidth limiting amount according to this virtual filter FL (if) and a bandwidth limiting amount of the DSP filter 59, this being stored as control data for the purpose of achieving an equivalent change for linked to these amounts, the CPU 71a executing control in accordance with an adjustment signal of the bandwidth adjuster 72 obtained via the interface circuit 71c.

However, the passband of the IF stage virtual filter FL (if) is established by the passband limited by the bandpass limiting established by the first IF filter 54 and the second IF filter 56 which are bandpass filters, and because these filters are analog filters, it is difficult to achieve ideal characteristics having a shape factor 1, and also impossible to achieve an attenuation amount of "infinity" outside of the passband.

Therefore, it is impossible to avoid the intrusion of an unwanted signal in the audio signal after detection, resulting in a worsening of the S/N ratio, and if an unwanted signal is at the carrier frequency, there is also a loss of clarity.

In this radio receiver, by providing a DSP filter 59 after detection, the shape factor can be set to a value near 1, and further the associated passband can be made to equivalently vary, linked to the passband of the virtual filter FL (if), thereby enabling accurate bandwidth limiting with simple operation, and the achievement of an audio output with a high S/N ratio.

In the radio receiver shown in FIG. 5, the DSP filter 59 performs bandwidth limiting with respect to the audio signal demodulated after the detection stage.

Figure 6:
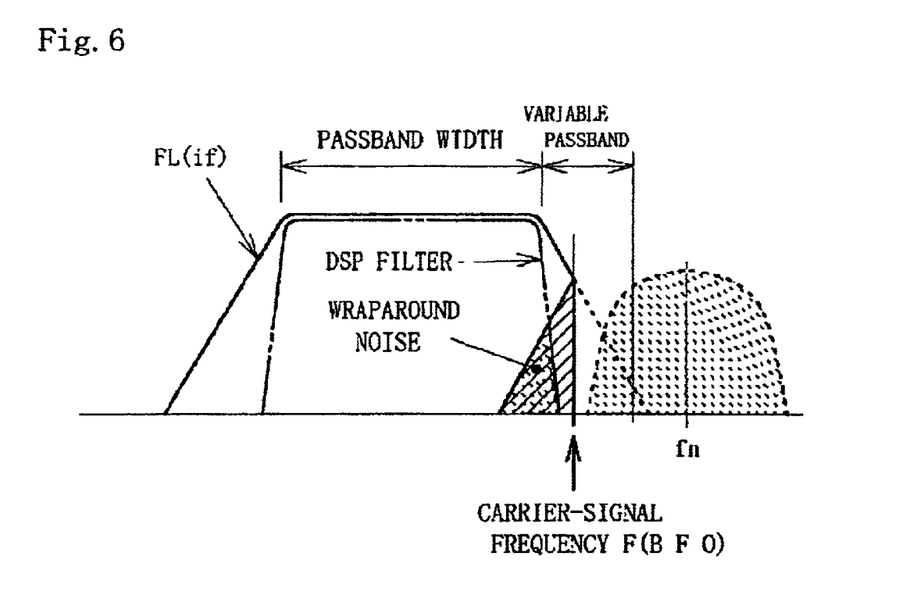
FIG. 6 shows the frequency characteristics of an intermediate-frequency circuit and a DSP filter for the purpose of illustrating the problems in the prior art.

In detection of a received SSB (J3E or R3E) signal, the carrier signal for demodulation from the BFO 57a as noted above must be mixed in the detector 57 to obtain the demodulated signal. However, the second IF signal before detection is subjected to bandwidth limiting by the first IF filter 54 and the second IF filter 56, so that, as shown in FIG. 6, because the shape factor of the IF stage virtual filter FL (if) is not that great, the carrier frequency for demodulation is within the deviation bandwidth.

In the above case, the frequency characteristics of the virtual filter FL (if) wrap around into the passband at the carrier signal frequency for demodulation, so that signal superimposition causes wraparound noise to intrude, and in particular if there is interference within the above-noted deviation bandwidth, this noise is wrapped around and enters the passband of the DSP filter 59, resulting in highly noticeable noise in the played back sound.

Therefore, even in the above-noted radio receiver in which an equivalent change is made by linking the passbands of the virtual filter FL (IF) and the DSP filter 59, it is not possible to eliminate this wraparound noise, and if elimination is done, it is necessary to make the passband of the DSP filter 59 even narrower.

Accordingly, it is an object of the present invention to provide a bandpass limiting apparatus that solves the above-noted problem, making effective use of the characteristics of a DSP filter that enables setting of a sharp shape factor.

SUMMARY OF THE INVENTION

The present invention is a bandpass limiting apparatus in a receiver of the superheterodyne type, in which a plurality of frequency conversions are performed, this apparatus having a bandpass changing means for controlling an intermediate-frequency circuit and broadening, narrowing, and/or shifting the passband of the intermediate-frequency signal obtained from the final stage thereof, an A/D conversion means for converting this intermediate-frequency signal to a digital signal, a digital signal processing means for broadening, narrowing, and/or shifting the passband of the intermediate-frequency signal converted to a digital signal by the A/D conversion means, a detection means for obtaining an audio signal detected from the digital signal output by the digital signal processing means, a passband changing means that changes the passband based on an adjustment signal from an adjustment operation part, and a control means, which, by controlling the digital signal processing means, causes the passband of the intermediate-frequency signal at each stage to change in concert.

According the present invention, it is possible, using a digital signal processing means (DSP) at the first stage of a detection means, to cause broadening or narrowing and/or movement of the passband, thereby enabling bandpass limitation with a sharp shape factor.

Therefore, because the cause of wraparound noise in the detection means is eliminated, it is possible to perform audio playback with a high S/N ratio.

Although, in the present invention, the digital signal processing means has a data processing speed that enables proper processing of an intermediate-frequency signal, such DSP's having this high processing speed are only used in specialized fields, and are not only difficult to obtain but also high in cost.

Given the above, it is possible to provide a frequency conversion means which converts the intermediate-frequency signal to a frequency (frequency for processing) that is suitable for the data processing speed of the digital signal processing means, thereby enabling implementation with a conventional DSP.

In this case, the bandwidth of the frequency for processing is broadened, narrowed, and/or shifted by the digital signal processing means, and the control means causes a change in the bandpass of the intermediate-frequency signal and the signal for processing in concert, thereby achieving the same effect as the present invention.

Although it is possible as a detection means to D/A convert the digital signal obtained from the digital signal processing means and to perform conventional analog detection, it is alternatively possible have a configuration which converts the digital signal to a digital signal corresponding to the audio signal after detection, this converted digital signal being then D/A converted.

In particular, development is being pursued of DSP's which are capable of not only a filtering function but also a detection function, so that they can perform detection at the digital signal stage, thereby enabling a simplification of the circuit configuration.

Thus, in a specific circuit configuration, the digital signal processing means and detection means can be mounted on one and the same chip or one and the same board, and it is further possible to mount thereon an A/D conversion means and a D/A conversion means.

BRIEF DESCRIPTION OF THE DRAWINGS

The above and other features of the present invention will be better understood by reading the description of exemplary embodiments to follow, making reference to the accompanying drawings, of which.

DESCRIPTION OF THE PREFERRED EMBODIMENTS

A preferred embodiment of a bandpass limiting apparatus for a receiver according to the present invention is described in detail below, with references made to FIG. 1 to FIG. 4.

Figure 1:
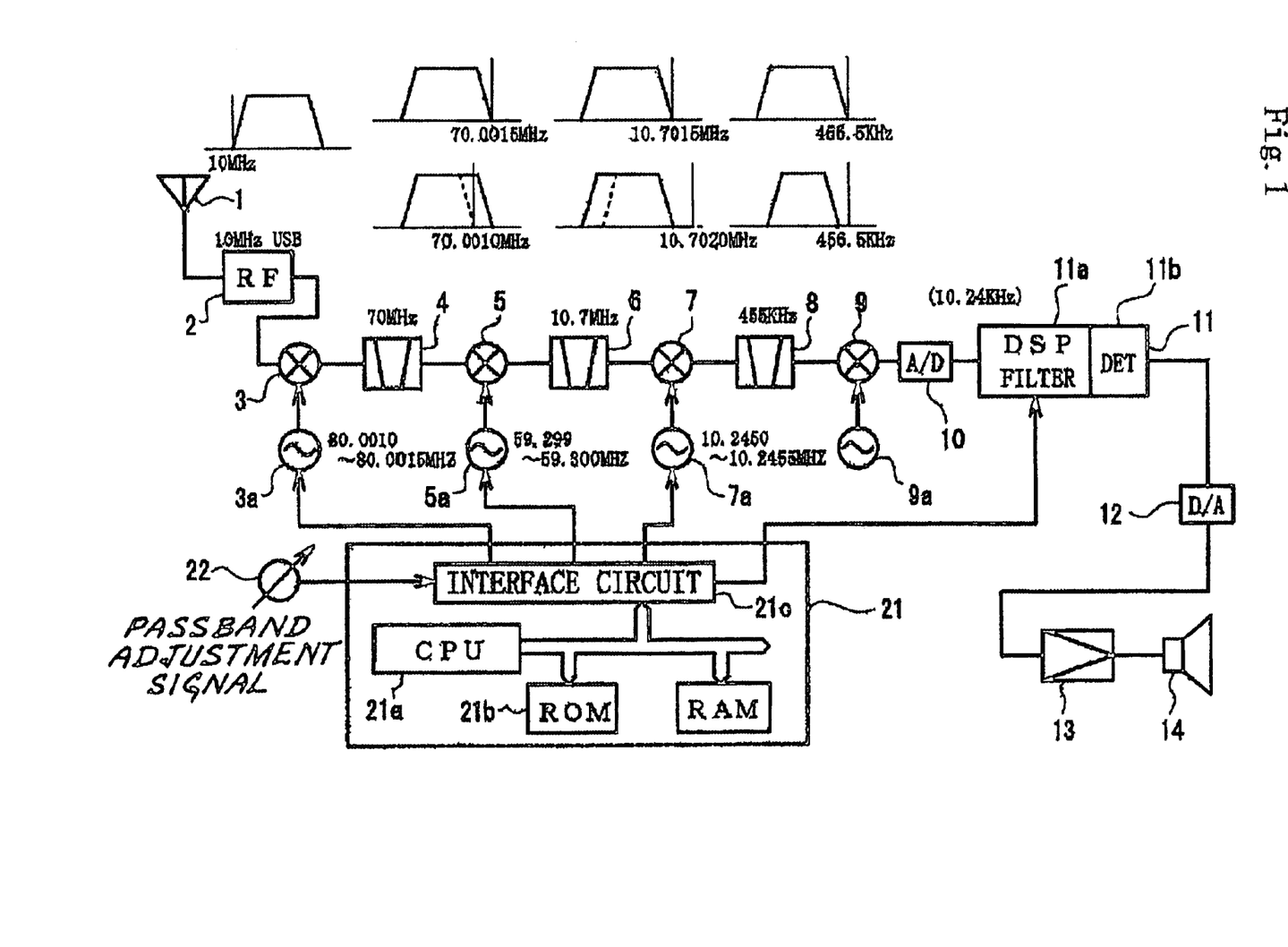
FIG. 1 is a system block diagram of a radio receiver according to an embodiment of the present invention.

FIG. 1 is a system block diagram of a radio receiver for SSB (radio signal type; J3E or R3E) according to an embodiment of the present invention.

In this radio receiver, first a received signal (in this case, in the 10-MHz band) from the antenna 1 is amplified by an RF amplifier 2 and input to a first frequency mixer 3, at which it is mixed with a local oscillation signal (80 MHz) from a first local oscillator 3a, thereby resulting in a first intermediate-frequency signal (70 MHz) using a first intermediate-frequency filter (BPF) 4.

Next, the first intermediate-frequency signal is input to a second frequency mixer 5, at which it is mixed with a local oscillator signal (59.3 MHz) from a second local oscillator 5a, so as to obtain a second intermediate-frequency signal (10.7 MHz) using a second intermediate-frequency filter (BPF) 6.

Additionally, the second intermediate-frequency signal is input to a third frequency mixer 7, at which it is mixed with a local oscillator signal (10.245 MHz) from a third local oscillator 7a, so as to obtain a third intermediate-frequency signal (455 kHz) using the third intermediate-frequency filter (BPF) 8.

Then, the third intermediate-frequency signal is input to a fourth frequency mixer 9, at which it is mixed with a local oscillator signal (444.76 kHz) from a fourth local oscillator 9a, thereby converting it to a fourth frequency signal at 10.24 kHz.

This is done because it is not possible to apply the data processing speed of DSP 11 to a signal at 455 kHz. However, if it is possible to capture and process the third intermediate-frequency signal (455 kHz) using the DSP 11, it is possible to eliminate the fourth frequency mixer 9 and the fourth local oscillator 9a.

The converted fourth frequency signal has (10.24 kHz) is converted to a digital signal by the A/D converter 10 and then input to the DSP 11, which has a digital filter function (11a), digital detection being done of a signal bandlimited by the passband thereof using a detection function (11b), so as to obtain a demodulated signal (digital signal). In the DSP 11, the carrier-frequency signal for demodulation is generated internally and a detection function is executed.

The audio signal that is demodulated from the received signal is therefore output from the DSP 11 as a digital signal, this being converted to an analog signal by the D/A converter 12, after which this signal is amplified by the audio amplifier 13, and output as a played back audio signal from the speaker 14.

In this radio receiver, similar to the case of the radio receiver shown in FIG. 5, the microcomputer circuit 21, based on an adjustment signal from the adjustment operation part 22 adjusts the various local oscillation frequencies of the first local oscillator 3a, the second local oscillator 5a, and the third local oscillator 7a, and sends control data to the DSP 11, enabling variation of the bandwidth characteristics of the associated digital filter.

That is, in addition to performing a control of the IF width an IF shift, in the intermediate-frequency circuitry, the filter function (11a) of the DSP 11 is also configured to perform bandwidth limiting, the amount of limiting of these bandwidths being set by a control program that causes storage beforehand into the ROM 21b of the microcomputer circuit 21 and a control table. The CPU 21a, in response to an adjustment signal from the adjustment operation part 22, performs variation of the bandwidth, by transferring control table data from the interface 21c to the various local oscillators 3a, 5a, and 7a.

Taking the example of the intermediate-frequency circuitry, in the case of varying the frequency of the first local oscillator 3a from 18.001 to 18.0015 MHz, varying the frequency of the second local oscillator 5a from 59.299 to 59.300 MHz, and varying the frequency of the third local oscillator 7a from 10.2450 to 10.2455 MHz, it is possible to vary the IF width over a maximum bandwidth of 3 kHz and a minimum bandwidth of 2 kHz with the third IF frequency of 455 kHz as a center frequency, and further possible to vary the IF shift a maximum of 500 kHz.

The above-noted IF width and IF shift control is perform using the cutoff characteristics of the IF filters 4, 6, and 8, which are analog filters provided in each stage of the IF circuitry.

Figure 2:
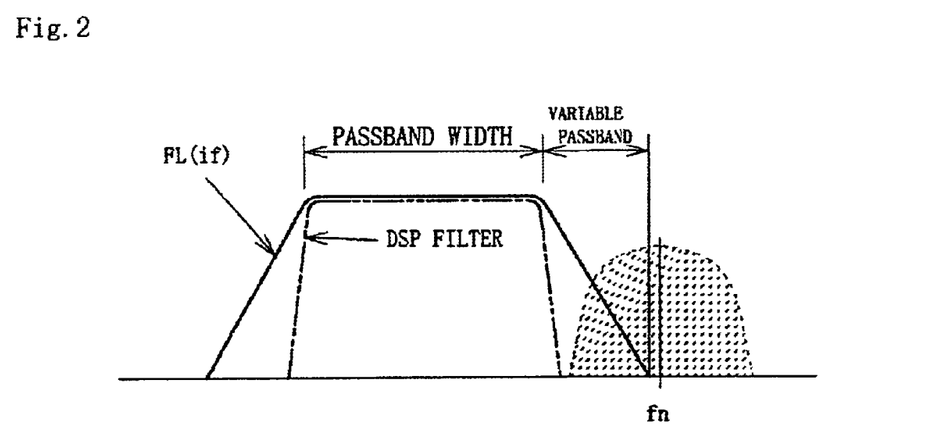
FIG. 2 is a drawing showing the frequency characteristics of the intermediate circuit and the DSP filter function for the purpose of illustrating of the principle of the present invention.

Therefore, as shown in FIG. 2, the shape factor of the virtual filter FL (if) of the overall IF circuitry becomes relatively large, so that the deviation passband of the frequency characteristics thereof widens, thereby increasing the possibility of the intrusion of noise such as interference into the deviation passband.

In the prior art, as shown in FIG. 5, after the detection circuit 57, a DSP filter 59 is provided. However, as shown in FIG. 6, when detecting the IF signal, if the carrier frequency for demodulation is within the deviation passband, there is intrusion of wraparound noise, and it is impossible to eliminate this using the DSP filter 59.

However, with a radio receiver according to this embodiment of the present invention, even if noise such as interference enters the deviation passband of the virtual filter FL (if) of the overall IF circuitry, in the DSP filter function (11a), bandwidth limiting is already perform using a filter characteristic having a shape factor that is nearly 1, after which demodulation is performed by the detection function (11b), so that this noise does not enter the passband.

In this radio receiver, there is a linking between the bandpass limiting amount by IF width and IF shift control and the bandpass limiting amount by the DSP filter function (11a).

In this case, it is possible, such as in a radio receiver of the prior art, to vary the various bandwidth limiting amounts by equivalent amounts, in response to a control adjustment signal from the adjustment operation part 22, although it is alternatively possible to adopt a control method whereby the bandwidth limiting amount of the IF circuit 3 is set so that it is larger than the bandwidth limiting amount of the DSP filter functions (11a), and bandwidth limiting by IF width and IF shift control is applied with priority, as the bandwidth limiting by the DSP filter function (11a), is gradually applied.

Figure 3:
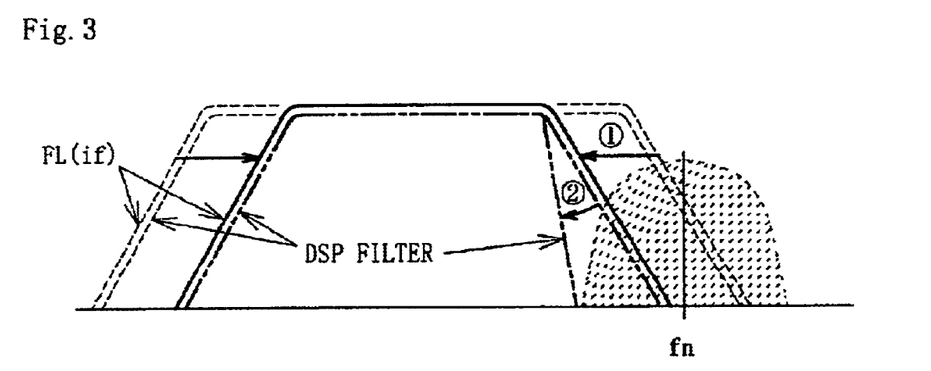
FIG. 3 is a drawing showing frequency characteristics, wherein bandpass control with respect to the intermediate frequency circuit in the initial adjustment stage and bandpass control of the DSP filter function are varied equivalently, after which shape factor control is performed by means of the filter function of the DSP.

In addition, because the bandwidth control of the DSP 11 filter function (11a) and control of the shift factor thereof are performed independently without mutual correlation, as shown in FIG. 3, in the initial adjustment stage, the bandwidth limiting amount by IF width and IF shift control and bandwidth limiting amount by the DSP filter functions (11a) are made equivalent (<1>) and at a stage at which the bandwidth has been somewhat limited so that noise is assumed to attenuated, control is performed so as to bring the shape factor only of the DSP filter function (11a) close to the value 1(<2>), thereby enabling the removal of noise components within the deviation passband to outside the passband, without performing excessive bandwidth control, facilitating perception of the adjustment condition as an additional advantage.

In either case, as shown in FIG. 2, noise that enters deviation passbands of the virtual filter FL (if) of the overall IF circuitry is eliminated by the filter characteristics of the DSP filter function (11a) which have a sharp shape factor, after which the signal is subject to detection processing, so that there is no possibility of a problem occurring with wraparound noise at the detection stage, thereby making it possible to play back an audio signal with a high S/N ratio.

Figure 4:
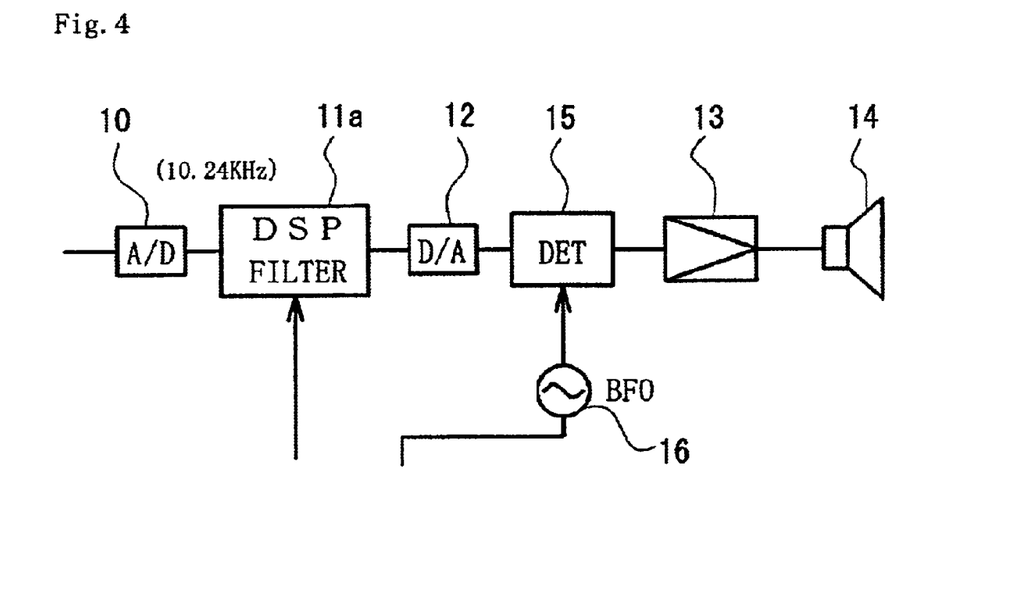
FIG. 4 is a circuit block diagram for the case of the configuration of an analog detection circuit.

In the above-noted embodiment, the DSP 11 has both a filter function (11a) and a detection function (11b), this functions being executed by means of digital signal processing. However, it will be understood that it is alternatively possible, as shown in FIG. 4, to impart only a filter function (11a) to the DSP 11, the output signal from which is converted to analog form by the D/A converter 12, and demodulated to a audio signal by the analog detection circuit 15, thereby providing an audio signal for playback.

In this case as well, because detection is performed after bandwidth limiting done by the filter function (11a) of the DSP 11, even if the frequency of the carrier for demodulation from the BFO 16 falls within the passband of the virtual filter FL (if) of the overall IF circuitry, it is possible to avoid the introduction of noise such as interference into the passband.

By adopting the configuration described in detailed above, a bandpass limiting apparatus for a radio receiver according to the present invention achieves a number of effects.

According to one embodiment the present invention, a digital signal processing means is provided before a detection means, and bandwidth limiting by a digital signal processing means is done linked to IF circuitry bandwidth limiting performed by means of IF width and IF shift control. The result is that, even if noise enters the deviation passband of the virtual filter characteristics of the circuitry, this noise is eliminated by the sharp shape factor of the digital signal processing means, after which detection is performed, thereby solving the problem of noise wrap-around of noise such as interference into the passband, as was a problem in the past, and enabling playback of received audio signal with a high S/N ratio.

Another effect of the present invention is that, because noise entering the deviation passband such as in the past is eliminated, there is no need to perform excessive band pass limiting.

According to a second embodiment the present invention it is possible to use a conventional DSP, as opposed to a DSP with a fast data processing speed, as the digital signal processing means, thereby enabling a reduction in cost of the radio receiver.

According to another embodiment the present invention, the detection function is executed by digital signal processing and both the filter function and the detection function are incorporated into the DSP, thereby simplifying the circuit configuration.

What is claimed is:

1. A bandpass limiting apparatus in a receiver of the superheterodyne type, in which a plurality of frequency conversions are performed, said apparatus comprising:
   a bandpass changing means for controlling an intermediate-frequency circuit having a plurality of frequency converting stages outputting intermediate-frequency signals, said bandpass changing means being operable to adjust a passband of an analog intermediate-frequency signal obtained from a final stage of said intermediate-frequency circuit;
   an A/D conversion means for converting said analog intermediate-frequency signal to a digital signal;
   a digital signal processing means for adjusting the passband of said intermediate-frequency signal converted to a digital signal by said A/D conversion means;
   a detection means for obtaining an audio signal detected from said digital signal output by said digital signal processing means;
   a passband changing means for changing a passband based on an adjustment signal from an adjustment operation part; and
   a control means responsive to said adjustment signal from said adjustment operation part and operable to cause said passband of said analog intermediate-frequency signals at each said frequency converting stage to change in concert.

2. A bandpass-limiting apparatus according to claim 1 wherein:
   said detection means obtains said audio signal from said digital signal output; and
   said audio signal is then converted to an analog audio signal by a D/A converter.

3. The bandpass limiting apparatus according to claim 1 wherein:
   said bandpass changing means is operable to broaden said passband of said analog intermediate-frequency signal.

4. The bandpass limiting apparatus according to claim 1 wherein:
   said bandpass changing means is operable to narrow said passband of said analog intermediate-frequency signal.

5. The bandpass limiting apparatus according to claim 1 wherein:
   said bandpass changing means is operable to shift said passband of said analog intermediate-frequency signal.

6. The bandpass limiting apparatus according to claim 1 wherein:
   said bandpass changing means is operable to broaden and shift said passband of said analog intermediate-frequency signal.

7. The bandpass limiting apparatus according to claim 1 wherein:
   said bandpass changing means is operable to narrow and shift said passband of said analog intermediate-frequency signal.

8. The bandpass limiting apparatus according to claim 1 wherein:
   said digital signal processor is operable to limit a bandwidth of said digital signal in response to said adjustment signal.

9. The bandpass limiting apparatus according to claim 1 wherein:
   said digital processing means is operable to broaden said passband of said digital signal.

10. The bandpass limiting apparatus according to claim 1 wherein:
    said digital processing means is operable to narrow said passband of said digital signal.

11. The bandpass limiting apparatus according to claim 1 wherein:
    said digital processing means is operable to shift said passband of said digital signal.

12. The bandpass limiting apparatus according to claim 1 wherein:
    said digital processing means is operable to broaden and shift said passband of said digital signal.

13. The bandpass limiting apparatus according to claim 1 wherein:
    said digital processing means is operable to narrow and shift said passband of said digital signal.

14. A bandpass limiting apparatus in a receiver of the superheterodyne type, in which a plurality of frequency conversions are performed, said apparatus comprising:
    a bandpass changing means for controlling an intermediate-frequency circuit with a plurality of frequency converting stages outputting intermediate-frequency signals, said bandpass changing means being operable to adjust a passband of an analog intermediate-frequency signal obtained from a final stage of said intermediate-frequency circuit;

a frequency conversion means for changing said intermediate-frequency signal to a frequency signal for processing that is suitable for a data processing speed of a digital signal processing means;

an A/D conversion means for converting said intermediate-frequency signal to a digital signal;

a digital signal processing means for for receiving said intermediate-frequency signal converted to a digital signal by said A/D conversion means and adjusting a passband of said digital signal;

a detection means for obtaining an audio signal detected from said digital signal output by said digital signal processing means; and a control means responsive to an adjustment signal from an adjustment operation part and operable to cause said passband of said intermediate-frequency signals at each said frequency converting stage to change in concert.

15. The bandpass limiting apparatus according to claim 14 wherein:

said detection means obtains said audio signal from said digital signal output; and said audio signal is then converted to an analog audio signal by a D/A converter.

16. A bandpass limiting apparatus in a superheterodyne receiver in which a plurality of frequency conversions are performed, said apparatus comprising:

a bandpass changer operable to control an intermediate-frequency circuit and selectively perform at least one of a broadening, narrowing, or shifting operation to a passband of an intermediate-frequency signal obtained from a final stage thereof;

an A/D converter operable to convert said intermediate-frequency signal to a digital signal;

a digital signal processor operable to selectively perform at least one of a broadening, narrowing, or shifting operation to the passband of said intermediate-frequency signal converted to a digital signal by said A/D converter;

a detector operable to obtain an audio signal detected from said digital signal output by said digital signal processor;

a passband changer operable to change a passband of said audio signal based on an adjustment signal from an adjustment operation part; and a controller responsive to said adjustment signal from said adjustment operation part for selectively controlling said intermediate-frequency circuit to cause said passband of said intermediate-frequency signal at each stage to change in concert.

17. A bandpass limiting apparatus in a superheterodyne receiver in which a plurality of frequency conversions are performed, said apparatus comprising:

a signal receiver including an antenna for receiving a first signal;

a bandpass changer in electrical communication with said signal receiver and operable to receive said first signal, said bandpass changer operable to transmit said first signal through a plurality of frequency mixers at multiple stages for filtering a passband of an analog intermediate-frequency signal obtained from providing said first signal to said mixers;

an A/D converter operable to convert said analog intermediate-frequency signal output from said bypass changer to a digital signal;

a digital signal processor operable to modify said passband of said intermediate-frequency signal converted to a digital signal by said A/D converter;

a detector operable to obtain an audio signal detected from said digital signal output by said digital signal processor;

a passband changer operable to change a passband of said audio signal based on an adjustment signal from an adjustment operation part; and a controller responsive to said adjustment signal from said adjustment operation part for selectively controlling said multiple stages wherein said passband of said analog intermediate-frequency signal may be changed at each said stage in concert.

18. The bandpass limiting apparatus according to claim 17 wherein:

said bandpass changer includes a first mixer operable to mix said first said signal to produce a first intermediate-frequency signal, a second mixer operable to mix said first intermediate-frequency signal into a second intermediate-frequency signal, and a third mixer operable to mix said second intermediate-frequency signal into a third intermediate-frequency that is passed to said A/D converter.

19. The bandpass limiting apparatus according to claim 18 further including:

a fourth mixer in said bandpass changer operable to mix said third intermediate-frequency signal into a fourth intermediate-frequency signal to be passed onto said A/D converter.

20. The bandpass limiting apparatus according to claim 17 wherein:

said bandpass changer includes at least three mixers operable to reduce an incoming first signal to a frequency of less than or equal to 455 KHz.

21. The bandpass limiting apparatus according to claim 20 wherein:

each of said mixers include an oscillator responsive to said controller.

22. The bandpass limiting apparatus according to claim 17 wherein:

said bypass changer is operable to provide said intermediate-frequency signal directly to said A/D converter.

23. The bandpass limiting apparatus according to claim 17 wherein:

said digital signal processor is operable to directly receive said intermediate-frequency signal.

24. The bandpass limiting apparatus according to claim 17 wherein:

said detector is operable to obtain said audio signal after digital signal processor converts said intermediate-frequency signal to a digital signal.

25. The bandpass limiting apparatus according to claim 24 wherein:

said detector is operable to provide said audio signal to a digital to analog converter for converting said audio signal into an analog signal.

26. A bandpass limiting apparatus in a receiver of the superheterodyne type in which a plurality of frequency conversions are performed, said apparatus comprising:

an antenna operable to receive a first signal;

a first amplifier operable to receive and amplify said first signal;

a first analog filter including a first mixer, a first oscillator, and a first cutoff filter, said first mixer operable to receive to said first signal and a first input from said first oscillator to output a first reduced frequency signal to said first cutoff filter operable to output a first intermediate-frequency signal;

a second analog filter including a second mixer, a second oscillator, and a second cutoff filter, said second mixer operable to receive to said first intermediate-frequency signal and a second input from said second oscillator to output a second reduced frequency signal to said second cutoff filter operable to output a second intermediate-frequency signal;

a third analog filter including a third mixer, a third oscillator, and a third cutoff filter, said third mixer operable to receive to said second intermediate-frequency signal and a third input from said third oscillator to output a third reduced frequency signal to said third cutoff filter operable to output a third intermediate-frequency signal;

an analog to digital converter operable to receive said third intermediate-frequency signal and convert said third intermediate-frequency signal to a digital signal with an audio signal component;

a digital signal processor operable to receive said digital signal and including a digital filter operable to control a width and shift of a passband for said digital signal;

an audio signal detector operable to extract said audio signal from said digital signal output by said digital signal processor; and a controller in communication with said oscillators and said digital signal processor and including an adjustment operation part operable to selectively issue an adjustment signal to alter a passband of said intermediate-frequency signals to change in concert and a passband of said digital filter.

* * * * *